United States Patent [19]

Burton

[11] 4,350,912

[45] Sep. 21, 1982

[54] WICK LUBRICATION SYSTEM FOR SELF-ALIGNING BEARING

[75] Inventor: Stephen J. Burton, St. Louis, Mo.

[73] Assignee: Emerson Electric Co., St. Louis, Mo.

[21] Appl. No.: 126,992

[22] Filed: Mar. 3, 1980

[51] Int. Cl.³ .............................................. H02K 5/16
[52] U.S. Cl. ......................................... 310/90; 308/72
[58] Field of Search .................... 310/90; 308/72, 125, 308/132

[56] References Cited

U.S. PATENT DOCUMENTS

| | | | |
|---|---|---|---|
| 3,013,847 | 12/1961 | Gits | 308/125 |
| 3,164,422 | 1/1965 | Shaffer | 308/132 |
| 3,235,317 | 2/1966 | Cunningham | 308/132 |
| 4,198,584 | 4/1980 | Otto | 310/90 |
| 4,219,245 | 8/1980 | Lewis | 308/72 |

*Primary Examiner*—R. Skudy
*Attorney, Agent, or Firm*—Polster, Polster and Lucchesi

[57] ABSTRACT

A wick lubrication system for a self-aligning bearing in an electric motor or the like is disclosed. Typically, the motor includes a rotor shaft, a bearing support and a self-aligning bearing supported thereby journalling the rotor shaft of the motor. Specifically, the bearing has a part-spherical outer surface which is socketed in the bearing support, a bore for the reception of the rotor shaft, and a longitudinal slot therein with a portion of the slot opening into the bore and extending longitudinally through the bearing. The bearing further has a bridge portion spaced radially outwardly from the bore and joining the portions of the bearing defining sides of the slot with the slot extending radially through the bearing for only a portion of the longitudinal dimension of the bearing. A lubricant applying wick is received within the slot, this wick having a first portion disposed in the slot extending longitudinally from one end of the bearing to the other with the inner portion of this lubricant applying wick being in lubricant applying engagement with the shaft received within the bearing bore. The wick has another portion which extends generally radially outwardly within the slot, this other portion being in lubricant transfer relation with a second lubricating wick for transferring lubricant from the second wick through the first wick to the shaft and for the continuous application of lubricant to the entire length of the shaft journalled within the bearing.

5 Claims, 7 Drawing Figures

WICK LUBRICATION SYSTEM FOR SELF-ALIGNING BEARING

BACKGROUND OF THE INVENTION

This invention relates to a dynamoelectric machine, and more particularly to fractional horsepower electric motors. Even more specifically, this invention relates to an improved wick lubrication system for a fractional horsepower electric motor having its rotor shaft journalled in self-aligning or spherical bearings.

Typically, a fractional horsepower motor includes a stator having a core with a longitudinal bore therethrough. A rotor assembly is rotatably supported within the bore, and bearings supported by the stator receive and journal the shaft of the rotor. Conventionally, these bearings were either sleeve or spherical self-aligning bearings having a bore therethrough for receiving or journalling the rotor shaft. Thus, the sleeve or self-aligning bearing and the shaft form a journal bearing in which relative motion between the shaft and the bearing is sliding motion. Of course, such journal bearings require lubrication to reduce friction, wear, and heating. Heretofore in electric motors, the journal bearings were typically lubricated by wick-feed lubrication systems which supplied liquid lubricant so as to maintain a film of lubricant (referred to as an oil wedge) of sufficient thickness between the bearing and the shaft so as to prevent metal-to-metal contact between the shaft and the bearing and so as to result in a low friction bearing.

Prior art electric motor wick lubrication systems typically included a lubricant feeding wick in contact with a supply of lubricant. The feeding wick typically had a portion thereof which protruded through a window or opening in the bearing and which was in rubbing contact with the shaft for applying lubricant thereto so as to insure that an adequate lubricant film or oil wedge was present between the shaft and the bearing member. Oftentimes, as shown in FIG. 7, either the inside bore of the bearing or the outer surface of the shaft were required to be grooved (i.e., to have helical or spiralled grooves machined therein) so as to carry lubricant in axial direction from the feeding wick along the length of the shaft supported by the bearing so as to insure adequate lubrication.

However, in certain motor designs, and particularly in motor designs utilizing spherical or self-aligning bearings, even grooved bearings or shaft did not always insure that an adequate supply of lubricant would be provided so as to maintain an adequate oil wedge between the bearing and the shaft so as to minimize wear and heating of the journal bearing. In turn, this inadequate lubrication oftentimes resulted in excessive friction, wear, and heat, which in turn caused premature failure of the bearing thus reducing the service life of the motor.

Reference may be made to U.S. Pat. No. 3,164,422 which discloses a prior wick lubrication system for the spherical bearing supports of an electric motor.

Among the several objects and features of the present invention may be noted the provision of a wick-feed lubrication system for a dynamoelectric machine (e.g., a fractional horsepower motor) which supplies adequate lubricant to the shaft throughout the entire length of the shaft journalled within the bearing without the necessity of grooving either the shaft or the bearing;

The provision of such a lubrication system in which both the radial and thrust bearing surface of an electric motor bearing are adequately lubricated by a single feeding wick;

The provision of such a lubrication system in which the feeding wick is positively secured in place in lubricant applying contact with the shaft; and The provision of such a lubrication system which is of simple and economical construction, which is easy to install, and which is reliable in operation.

Other objects and features of this invention will be in part apparent and in part pointed out hereinafter.

SUMMARY OF THE INVENTION

Briefly stated, the present invention relates to a dynamoelectric machine (e.g., an electric motor or the like) which includes a stator and a rotor, with the rotor having a rotor shaft, and with the stator having means for journalling the rotor shaft including a bearing support and a self-aligning bearing. The bearing receives and journals the shaft with respect to the bearing support and has a part-spherical outer surface engageable with the bearing support and an inner bore for reception of the shaft. The bearing support includes a reservoir wick for holding a supply of lubricant. Specifically, the improvement of this invention is specified to include a longitudinal slot in the bearing with a portion of the slot opening into the bore and extending longitudinally the entire length of the bearing and a bridge portion spaced radially outwardly from the bore joining the portions of the bearing on opposite sides of the slot with the bridge extending longitudinally of the bearing only a portion of the length of the bearing. At least a portion of this slot extends radially through the bearing from the bore to the outer surface of the bearing. Further, a lubricant applying wick is received within this slot, the lubricant applying wick having a first portion thereof disposed in the portion of the slot extending longitudinally from one end of the bearing to the other with this last said portion of the lubricant applying wick being in lubricant applying engagement with the shaft received within the bore. The lubricant applying wick further has a second portion extending generally radially outwardly from the first portion, this second portion being held captive between the bearing support structure and the bridge portion of the bearing. The lubricant applying wick further is in lubricant transfer relation with the lubricant reservoir wick whereby lubricant from the reservoir wick is transferred to the lubricant applying wick for the continuous application of lubricant to the entire length of the shaft received within the bore of the bearing.

BRIEF DESCRIPTION OF THE DRAWINGS

Corresponding reference characters indicate corresponding parts throughout the several view of the drawings.

DESCRIPTION OF A PREFERRED EMBODIMENT

Figure 1:
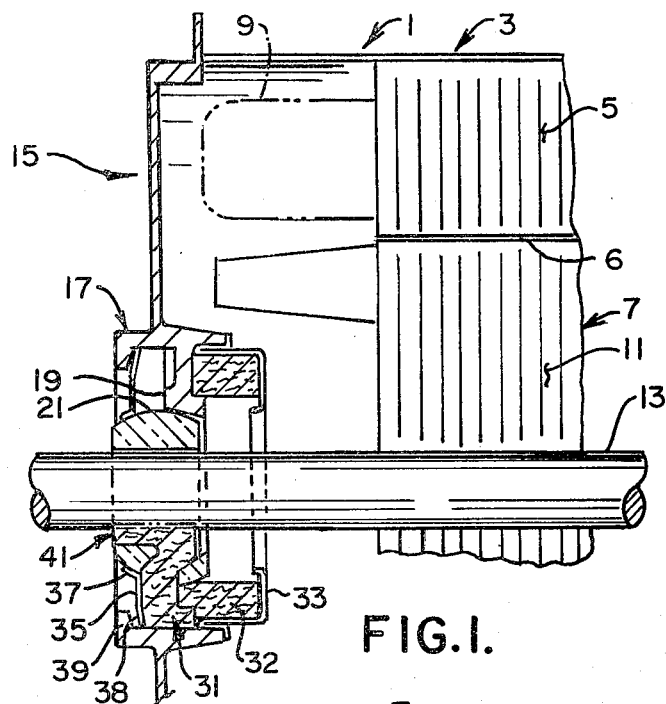
FIG. 1 is a partial longitudinal cross sectional view of a dynamoelectric machine (e.g., a fractional horsepower electric motor) incorporating the improved wick lubrication system of the present invention.
Figures 4, 5, 6:
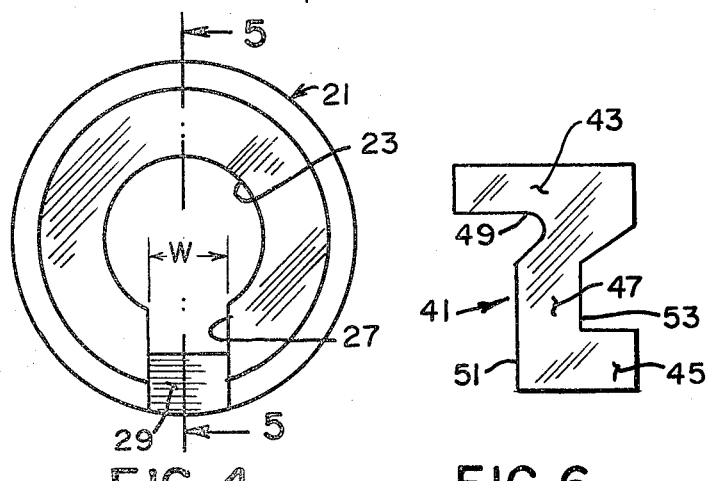
FIG. 4 is an enlarged cross sectional view taken along line 4—4 of FIG. 3 illustrating the end of a spherical, self-aligning bearing member.
FIG. 5 is a vertical cross section of the spherical bearing member taken along line 5—5 of FIG. 4 with a lubricant applying wick installed in a slot in the bearing member, the wick being shown in phantom.
FIG. 6 is a side elevational view of the lubricant applying wick.

Referring now to the drawings and particularly to FIG. 1, a dynamoelectric machine (e.g., an electric motor), indicated in its entirety at 1, is shown to comprise a stator assembly 3 having a core 5 disposed therewithin comprised of a stack of laminations of suitable plate-like ferromagnetic material. The core has a bore 6 extending longitudinally therethrough. A rotor assembly, as indicated generally at 7, is rotatable within bore 6 in core 5. Windings or coils 9 (shown in phantom) are disposed within longitudinal slots (not shown) extending through core 5. Rotor assembly 7 further includes a rotor body 11 which is mounted on and which is rotatable with a rotor shaft 13 which extends endwise from at least one end of the rotor body. Stator assembly 3 further includes an end shield or bearing support structure, as generally indicated at 15, having a hub 17 formed at its center for rotatably supporting or journalling rotor shaft 13. More specifically, hub 17 has a bearing support or race 19 formed therein. Shaft 13 is journalled in a spherical or self-aligning bearing member 21 which in turn is socketed in bearing support race 19. As is best shown in FIGS. 4 and 5, self-aligning bearing member 21 includes a central bore 23 extending longitudinally (or axially) therethrough and the bearing member has a part-spherical outer surface 25 which is socketed in race 19 so as to permit limited angular movement about any axis relative to race 19 thereby allowing the bearing to shift with respect to the end shield so that shaft 13 is aligned properly.

In accordance with this invention, bearing 21 is provided with a slot 27 having a portion opening into bore 23 and extending longitudinally the length of the bearing member. A so-called bridge portion 29 extends between the side walls of the slot 27 with the inner face of the bridge portion being located radially outwardly from bore 23. As best shown in FIG. 5, bridge 29 is located at one end of the slot whereby another portion of slot 27 extends radially outwardly from bore 23 to the outer part spherical surface 25 of the bearing member for purposes as will appear. As shown in FIG. 4, slot 27 has a width, as indicated by dimension W, and a length (shown in FIG. 5), as indicated by dimension L.

Figure 3:
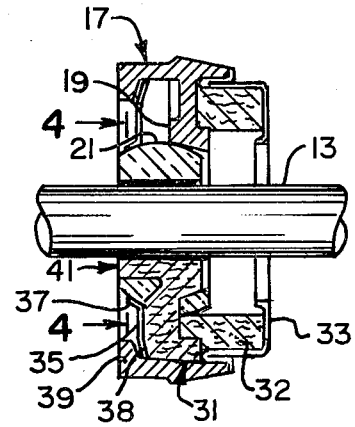
FIG. 3 is a vertical cross sectional view taken along line 3—3 of FIG. 2.

In FIG. 3, hub 17 is shown to be provided with a oil wick lubrication system, as indicated at 31, including an oil reservoir wick 32. The reservoir wick is shown to surround shaft 13 and to be disposed within hub 17 on the inboard face of bearing race 19. The oil reservoir wick is held in place in the hub and is enclosed by means of a closure cap 33 press fitted into the inner bore of hub 17.

Figure 2:
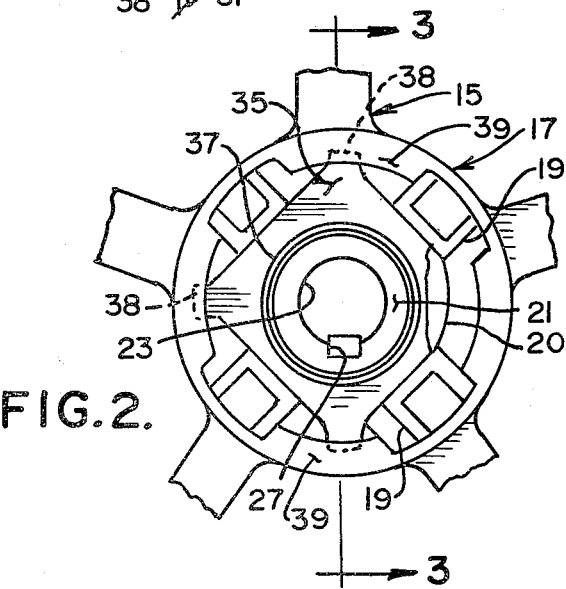
FIG. 2 is a left end view of the electric motor shown in FIG. 1 illustrating the hub of the end shield of the electric motor and a bearing assembly for journalling the shaft of the motor.

Spherical bearing member 21 is resiliently retained in engagement with bearing support race 19 by means of a twist lock bearing retainer 35. As shown in FIGS. 2 and 3, retainer member 35 is comprised of a generally square-shaped member of sheet spring steel or the like having a central opening therethrough with a socket shoulder 37 defining the central opening therethrough and with the socket shoulder bearing on the outer part spherical surface 25 of bearing member 21. As shown in FIG. 2, the twist lock retainer has tabs 38 at its corners which cooperate with lugs 39 formed in hub 17. Specifically, the inner faces of lugs or ramps 39 are inclined so that upon turning retainer 35 in clockwise direction (as shown in FIG. 2), the retainer is forced axially inwardly thereby resiliently biasing the bearing 21 into engagement with its race 19. Such a twist lock retainer is more fully disclosed in the coassigned U.S. patent, now U.S. Pat. No. 4,219,245.

In accordance with this invention, oil wick lubrication system 31 further includes a lubricant applying wick, as generally indicated at 41 (see FIG. 6). Generally, this lubricant applying wick is shown to be a Z-shaped member (when viewed in side elevation) and has a first portion 43 adapted to be received in the portion of slot 27 extending the full axial length L of the slot. As shown in FIG. 5, wick portion 43 also extends the length of bearing member 21. Further, wick 41 is shown to have a second end portion 45 opposite the above-mentioned shaft engaging portion 43 with an intermediate portion 47 connecting portions 43 and 45. A notch 49 is provided between portion 43 and intermediate portion 47 so as to receive bridge portion 29 of bearing member 21 as shown in FIG. 5. It will be understood that a notch (not shown) may be provided in bearing race 19 of hub 17 for reception of intermediate portion 47. Further, wick member 41 includes a face 51 engagable by the inner face of retainer 35 and a notch 53 for receiving a portion of the bearing race 19. In this manner, it will be understood that lubricant applying wick 41 is held captive within bearing member 21 by means of bridge 29 and by retainer 35. Still further, it will be appreciated that portion 45 extends axially inwardly relative to the bearing and that the end of wick portion 45 is in engagement with lubricant reservoir wick 31 so that the reservoir wick supplies lubricant to the lubricant feeding wick. This is best illustrated in FIG. 3. Further, it will be noted in FIG. 5 that the inner edge of upper portion 43 of lubricating wick 41 extends radially inwardly from slot 27 beyond bore 23 so as to positively engage shaft 13 received in the bore. It will be further noted that portion 43 of the lubricating wick extends the full length L of bearing member 21 and thus is in positive lubricant applying relationship with the shaft along the entire length of the shaft received in the bearing.

Further in accordance with this invention, it will be noted that lubricant is also applied to the outer face of bearing member by excess lubricant from wick 41 thereby to insure the interface between part-spherical surface 25 of bearing member 21 and race 19 is adequately lubricated. In this manner, both the radial and thrust surfaces (i.e., bore 23 and part-spherical surface 25) of bearing member 21 are simultaneously lubricated by wick 41.

Figure 7:
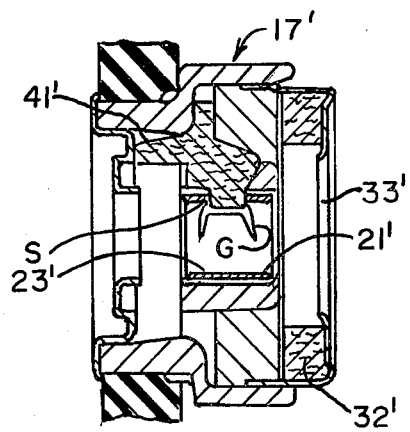
FIG. 7 is a view similar to FIG. 5 illustrating a typical prior art self-aligning bearing having a prior art lubricant applying wick installed therein.

Referring now to FIG. 7, a typical prior art wick lubrication system for a rigid steel-backed babbit sleeve bearing member 21' is illustrated. In FIG. 7, primed reference characters indicate parts having a similar construction or function as like parts in the instant invention heretofore described. Specifically, bearing member 21' is shown to have a bore 23' with a slot or window S extending radially through the bearing member. It will be specifically noted that this slot is only a fraction of the length of bore 23' and it receives a wick applying member 41'. Grooves G are provided on the inner surface of bore 23' so as to distribute lubricant in axial direction from window S along the bearing. Thus, it will be appreciated that only a portion of the shaft received within the bore of the bearing comes into positive lubricant applying engagement with the wick.

While the bearing illustrated in FIG. 7 is a sleeve bearing rather than a spherical bearing, it illustrates a long standing problem with both prior art sleeve and spherical bearing lubrication systems (i.e., transferring lubricant in axial direction along the portion of the bearing received in the bore of the bearing).

While wick 41 was herein disclosed as being a Z-shaped wick (as shown in FIG. 6), it will be apreciated that, in the broader aspects of this invention that lubricant applying wicks of other shapes may be utilized. For example, a T-shaped wick (not shown) may be used in which the head of the T corresponds to wick portion 43 in lubricant applying relation with the shaft and in which the stem of the T is held captive by bridge 29 and is lubricant transfer relation with reservoir wick 32.

In view of the above, it will be seen that the several objects and features of the present invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

I claim:

1. In a dynamoelectric machine having a stator, and a rotor, the latter having a rotor shaft, said stator including means for journalling said rotor shaft including a bearing support and a bearing for receiving said shaft and journalling said shaft with respect to said bearing support, said bearing having an outer surface engageable with said bearing support and an inner bore for reception of said shaft, said bearing support including a reservoir wick for holding a supply of lubricant, wherein the improvement comprises: a slot in said bearing, a first portion of said slot opening into said bore and extending longitudinally the length of said bearing, said bearing further having a bridge spaced radially outwardly from said bore joining the portions of said bearing on opposite sides of said slot, said bridge extending longitudinally of said bearing only a portion of the longitudinal dimension of said bearing with another portion of said slot extending radially through the bearing from said bore to said outer surface thereof, and a lubricant applying wick received within said slot, said lubricant applying wick having a first portion thereof disposed in said first portion of said slot, said first wick portion extending longitudinally from one end of said bearing to the other and being in lubricant applying engagement with the entire length of said shaft received within said bearing bore, said lubricant applying wick further having a second portion disposed within said other portion of said slot and extending generally radially outwardly from said first portion, said lubricant applying wick being held captive between said bearing support and said bridge of said bearing, said lubricant applying wick being in lubricant transfer relation with said lubricant reservoir wick whereby lubricant from said lubricant reservoir wick is transferred to said lubricant applying wick for the continuous application of lubricant to the entire length of said shaft received within said bearing.

2. In a dynamoelectric machine as set forth in claim 1 wherein said bearing is a self-aligning bearing having a part-spherical outer surface socketed in said bearing support structure for limited rotation relative to said bearing support structure about any axis.

3. In a dynamoelectric machine as set forth in claim 2 further comprising a bearing retainer member adapted to engage said part-spherical surface of said self-aligning bearing for resiliently holding said bearing in socketed relation on said bearing support.

4. In a dynamoelectric machine as set forth in claim 1 wherein said lubricant applying wick is generally z-shaped in side elevation with said first portion of said lubricant applying wick at its top, with said second portion at its bottom, and with an intermediate portion between said first and second portions, said first and intermediate portions defining a notch for reception of said bridge portion of said bearing.

5. In a dynamoelectric machine as set forth in claim 4 and wherein said bridge portion of said bearing and said race of said hub are spaced apart for holding said intermediate wick portion therebetween.

* * * * *